E. F. W. ALEXANDERSON.
HIGH FREQUENCY ALTERNATOR.
APPLICATION FILED APR. 26, 1909.

1,008,577.

Patented Nov. 14, 1911.

2 SHEETS—SHEET 1.

WITNESSES:
Lester H. Fulmer
J. Ellis Glen

INVENTOR
ERNST F. W. ALEXANDERSON.
BY Albert G. Davis
ATT'Y.

E. F. W. ALEXANDERSON.
HIGH FREQUENCY ALTERNATOR.
APPLICATION FILED APR. 26, 1909.
1,008,577.
Patented Nov. 14, 1911.
2 SHEETS—SHEET 2.
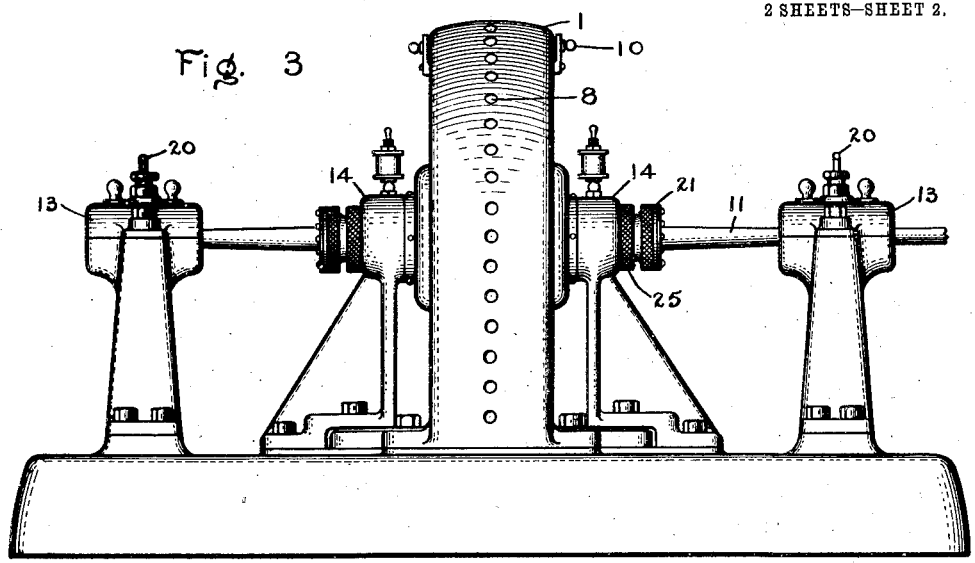
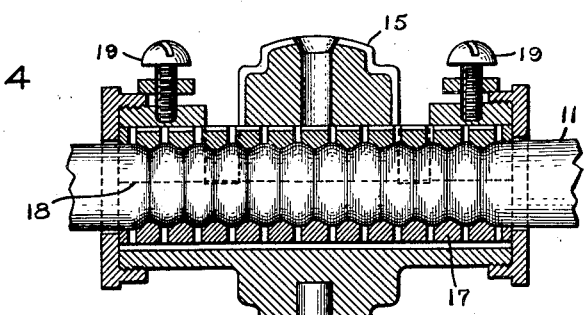
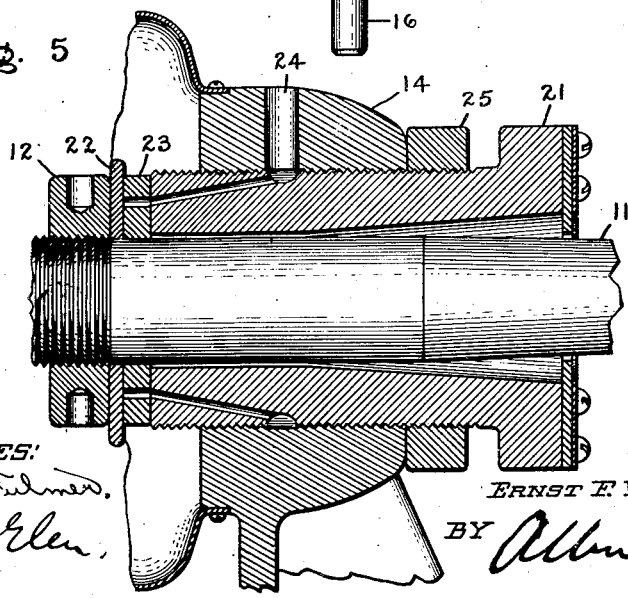

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

HIGH-FREQUENCY ALTERNATOR.

1,008,577.     Specification of Letters Patent.     Patented Nov. 14, 1911.

Application filed April 26, 1909. Serial No. 492,145.

*To all whom it may concern:*

Be it known that I, ERNST F. W. ALEXANDERSON, a citizen of the United States, residing at Schenectady, county of Schenectady, State of New York, have invented certain new and useful Improvements in High-Frequency Alternators, of which the following is a specification.

My invention relates to alternators for producing currents of high frequency, such as 100,000 cycles, and its object is to produce a machine which may be built to give a larger output than has ordinarily been obtainable heretofore from machines of this type.

To this end my invention comprises a number of features, which will best be understood by reference to the accompanying drawings.

Figure 1:
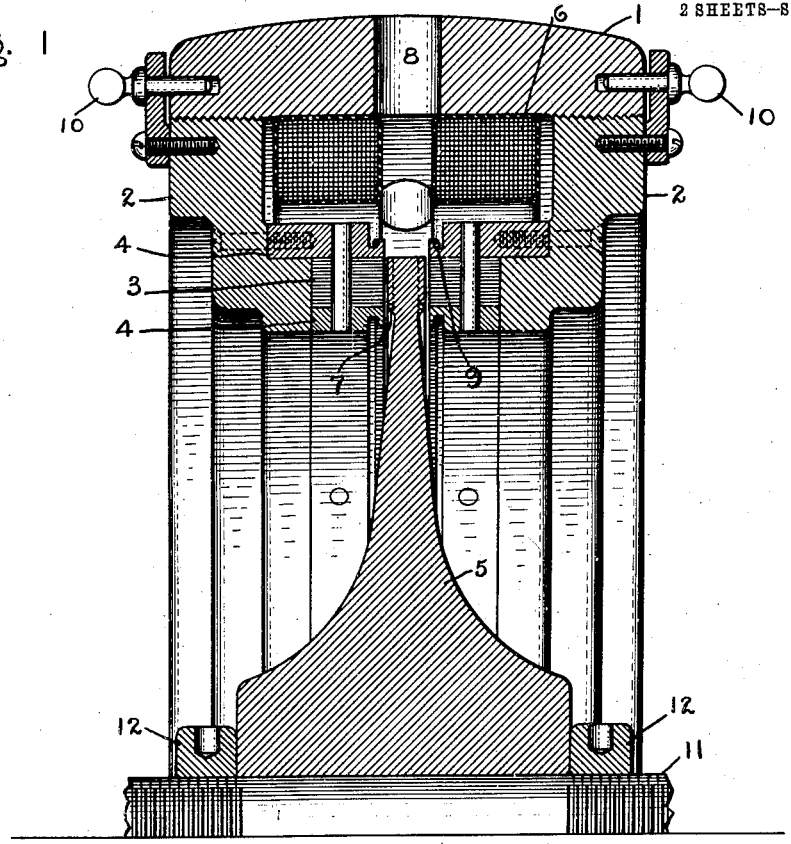
Figure 2:
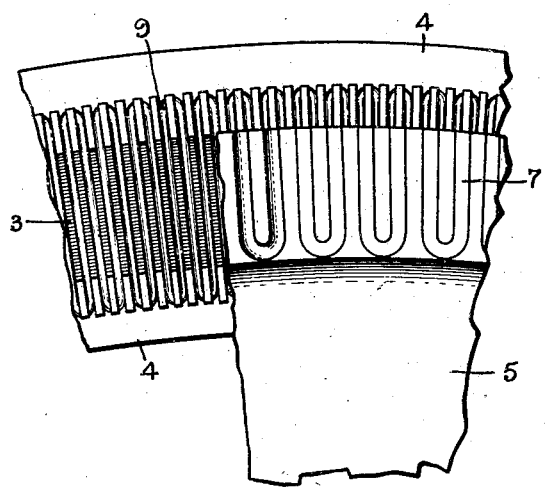

In the drawings Figure 1 shows a vertical cross section of the upper half of a high frequency alternator arranged in accordance with my invention; Fig. 2 shows an enlarged detailed view; Fig. 3 shows a side elevation of the machine; and Figs. 4 and 5 show enlarged cross-sectional views of the bearings.

In the drawings 1 represents the stator, into which are screw-threaded a pair of ring-shaped members 2—2. Each of these members carries a circumferentially extending laminated ring 3 clamped between two rings 4. These laminated rings have opposite faces lying in adjacent radial planes. Between these rings extends the periphery of a solid magnetic inductor 5.

6 represents the field coil, the magnetic circuit of which surrounds the coil and passes through the laminated rings 3 and the periphery of the inductor 5. The magnetic air-gaps between the inductor and laminated rings lie in radial planes. The periphery of the inductor 5 is slotted with approximately radial slots, as is indicated in dotted lines in Fig. 1, and is more clearly shown in Fig. 2, so as to form magnetic poles opposite the faces of the laminated rings 3. In order to avoid excessive windage at the high speeds at which the inductor is designed to operate, the slots in the inductor periphery are filled with non-magnetic members 7, which may be composed of U-shaped wires of high tensile strength, such as phosphor bronze hammered flat in the slots and soldered therein. The sides of the U lie in adjacent slots and the base of the U-faces toward the axis of the machine. In Fig. 2 eight adjacent slots in the inductor 5 are shown, two of them unfilled and the other six filled in the manner above described. The fillers thus formed are strong mechanically and give a smooth surface to the inductor so as to reduce the windage to a small amount. Ventilating holes 8 are provided in the stator opposite the periphery of the inductor.

The clamping rings 4 inside and outside of each laminated ring 3 are formed with radially extending flanges, as is clearly shown in Fig. 1. Both the clamping rings and the laminated rings between them are slotted, as shown in Fig. 2. Because of the flange formation of the clamping rings, the teeth formed by the slots in the faces of the clamping rings overhang. The armature winding 9, in which the high-frequency current is induced, may be formed of a continuous conductor wound zigzag through the slots in the laminated rings and clamping rings and passing under the overhanging ends of the teeth in the clamping rings, which teeth serve to hold the conductor securely in place.

As has already been pointed out, the supporting members 2 of the laminated rings 3 are screw-threaded into the stator 1. The purpose of this is to make each of the laminated rings axially adjustable toward or away from the conductor, so as to adjust the air-gap. The members 2, when properly adjusted, may be locked in position by the pins 10 carried by the members 2 and adapted to enter into any one of a circumferential series of holes in the side of the stator winding.

The shaft 11, which carries the inductor 5 is long and flexible, as shown in Fig. 3. The purpose of such a shaft is to allow the inductor, when up to speed, to revolve around its own center of gravity. Axial displacement of the inductor on the shaft is prevented by lock-nuts 12. The main bearings 13 are at a distance from the inductor, so as to permit the shaft to bend and the inductor to center itself on its own center of gravity when up to speed. Other bearings 14 are placed near the inductor. These bearings are normally out of engagement with the shaft, but are engaged by the shaft when the inductor vibrates when passing its critical speed in coming up to speed. At this time these bearings 14 serve to prevent such excessive vibration as might bring the periphery of the inductor into engagement with the laminated rings of the stator.

In order to obtain good efficiency in a machine of this character, the air-gap should be small, and since the air-gaps of the machine lie in radial planes, it is necessary to prevent axial displacement of the inductor in running. By a novel arrangement of the bearings, I maintain automatically in operation the proper adjustment of the inductor, utilizing to this end the thrust that is produced, whenever the inductor departs from the position exactly midway between the laminated rings, by the increased magnetic pull on the side of the smaller air-gap.

The bearings 13 and 14 are shown in cross-section in Figs. 4 and 5, respectively. The member 15 of bearing 13 is of the usual self-alining construction, provided with the usual pin 16. The shaft 11, where it passes through the bearing, is grooved, as shown, and between it and the member 15 is a cylindrical member 17, which, for the purpose of assembling, is formed in two parts, as indicated by the dotted line 18, which parts are clamped together and to the member 15 by screws 19. The member 17 is grooved on its inner side to fit the grooves in the shaft 11, so that it both supports the weight of the shaft and is adapted to receive an end-thrust on the shaft, and at the same time, while rigid with member 15, moves with that member in its self-alining action to permit the bending of the shaft when the machine is up to speed. The member 17 is slotted and pierced with holes to receive oil which may be supplied to the bearings 13 by pipes 20. As is clearly shown in Fig. 4, the oil is fed freely to the entire contact surface between the shaft 11 and the member 17.

The bearing 14 has screw-threaded into it the member 21, which surrounds the shaft 11 so loosely that during normal running it is not engaged by the shaft, but, during the vibration that occurs while the inductor is being brought up to speed and is passing its critical speed, the member 21 is engaged by the shaft 11 and serves to limit the vibration of the inductor. At the same time the member 21 serves as an end-thrust bearing for the inductor. The washer 22 is fast to the shaft and rotates with the inductor and the lock nuts 12. The member 23 is stationary and has a bearing engagement with the washer 22. Oil is supplied to the bearing surfaces through holes 24. The purpose of employing this end-thrust bearing close to the inductor in addition to the outside bearings, which are also adapted to receive end-thrusts, is to maintain automatically a proper centering of the inductor between the faces of the stator. If the inductor moves slightly out of the center, the difference between the air-gaps on its opposite sides that is produced by this movement results in a magnetic pull on the inductor in an axial direction which tends to move the inductor farther from its central position. This magnetic pull produces an end-thrust on both bearings on one side of the inductor. The heat produced at the bearings on that side of the inductor is therefore increased, and this results in a slight expansion of the shaft on that side of the inductor, which automatically restores the inductor to its central position.

The member 21 is screw-threaded into the bearing 14 in order to permit its axial adjustment and the proper division of end-thrust between the bearings. A lock nut 25 is provided for securing the member 21 in position.

I do not desire to limit myself to the particular construction and arrangement of parts here shown, but aim in the appended claims to cover all modifications which are within the scope of my invention.

What I claim as new and desire to secure by Letters Patent of the United States, is:—

1. A high frequency alternator, comprising a stator carrying a pair of circumferentially extending laminated rings having opposite faces lying in adjacent radial planes, a winding carried in said faces, a solid magnetic inductor adapted to be driven at high speed having its periphery extending between said faces and having approximately radial slots on both sides opposite said faces whereby magnetic poles are formed between said slots, and non-magnetic fillers for said slots.

2. A high frequency alternator, comprising a stator carrying a pair of circumferentially laminated rings having opposite faces lying in adjacent radial planes, a winding carried in said faces, a solid magnetic inductor adapted to be driven at high speed having its periphery extending between said faces and having approximately radial slots in both sides opposite said faces whereby magnetic poles are formed between said slots, and U-shaped non-magnetic pieces carried in and filling said slots, the sides of each U lying in adjacent slots and the base of the U facing the axis of the inductor.

3. A high frequency alternator, comprising a stator carrying a pair of circumferentially extending laminated rings having opposite faces lying in adjacent radial planes, a winding carried in said faces, and a magnetic inductor adapted to be driven at high speed having its periphery extending between said faces and formed with magnetic poles opposite said faces, said laminated rings being adjustable axially toward and away from the inductor.

4. A high frequency alternator, comprising a stator carrying a pair of circumferentially extending laminated rings having opposite faces lying in adjacent radial planes, a winding carried in said faces, and a magnetic inductor adapted to be driven at high speed having its periphery extending between said faces and formed with magnetic poles opposite said faces, each of said laminated rings being screw-threaded into said stator whereby a turning of the ring in the stator moves the ring axially toward or away from the inductor.

5. A high frequency alternator, comprising a stator carrying a pair of circumferentially extending laminated rings having opposite faces lying in adjacent radial planes, clamping rings inside and outside of each laminated ring, both laminated rings and clamping rings being slotted on their faces with approximately radial slots and the clamping rings being formed at their faces with radially extending flanges so that the teeth formed in said faces by the slots overhang at their ends, a winding extending through the slots and beneath the overhanging ends of said teeth, and a magnetic inductor adapted to be driven at high speed having its periphery extending between said laminated rings and formed with magnetic poles opposite their faces.

6. A high frequency alternator, comprising a stator carrying a pair of circumferentially extending laminated rings having opposite faces lying in adjacent radial planes, clamping rings inside and outside of each laminated ring, both laminated rings and clamping rings being slotted on their faces with approximately radial slots and the clamping rings being formed at their faces with radially extending flanges so that the teeth formed in said faces by the slots overhang at their ends, a winding composed of a conductor wound zig-zag through said slots and under the overhanging ends of said teeth, and a magnetic inductor adapted to be driven at high speed having its periphery extending between said laminated rings and formed with magnetic poles opposite their faces.

7. A high frequency alternator of the inductor type having a radial air-gap on each side of the inductor between inductor and stator, a long shaft for the inductor, and four bearings, two on each side of the inductor, each adapted to receive end-thrust on the shaft, one bearing on each side of the inductor being comparatively close to the inductor and the other at a distance therefrom, whereby an increase in pressure on the two thrust bearings on one side of the inductor, due to a difference in length of the two air gaps, produces an appreciable expansion of the shaft between said two bearings due to increased heat.

In witness whereof, I have hereunto set my hand this 23rd day of April, 1909.

ERNST F. W. ALEXANDERSON.

Witnesses:
BENJAMIN B. HULL,
HELEN ORFORD.